United States Patent [19]
Alba

[11] Patent Number: 5,069,387

[45] **Date of Patent: * Dec. 3, 1991**

[54] CIBERNETIC FOUNTAIN APPARATUS AND VALVE THEREFOR

[75] Inventor: Emilio C. Alba, Madrid, Spain

[73] Assignee: Gibbs & Hill Espanola, Madrid, Spain

[ * ] Notice: The portion of the term of this patent subsequent to Jul. 4, 2006 has been disclaimed.

[21] Appl. No.: 274,119

[22] Filed: Nov. 21, 1988

Related U.S. Application Data

[63] Continuation-in-part of Ser. No. 137,405, Dec. 22, 1987, Pat. No. 4,844,341.

[30] Foreign Application Priority Data

Nov. 23, 1987 [ES] Spain .................................. 8703327

[51] Int. Cl.5 ........................ B05B 17/08; F21P 7/00; F16K 31/06

[52] U.S. Cl. .................................... 239/18; 251/117; 251/129.07

[58] Field of Search .............. 239/18; 251/117,129.07, 251/282

[56] References Cited

U.S. PATENT DOCUMENTS

| | | | |
|---|---|---|---|
| 1,977,997 | 10/1934 | Patterson | 84/464 |
| 2,787,495 | 4/1957 | Przystawik | 299/7 |
| 2,843,149 | 7/1958 | Peters | 137/624 |
| 2,970,771 | 2/1961 | Przystawik | 239/17 |
| 2,979,643 | 4/1961 | de Wilde et al. | 317/199 |
| 3,168,246 | 2/1965 | Musgrave | 239/22 |
| 3,292,861 | 12/1966 | Kawamura et al. | 239/17 |
| 3,307,787 | 3/1967 | Hall, Jr. | 239/17 |
| 3,337,133 | 8/1967 | Duerkob | 239/18 |
| 3,506,237 | 4/1970 | Tometsko | 251/138 |
| 3,570,764 | 3/1971 | Inoue | 239/17 |
| 3,595,479 | 7/1971 | Freeman | 239/23 |
| 3,737,141 | 6/1973 | Zeuner | 251/129.07 |
| 3,773,258 | 11/1973 | Hruby, Jr. | 239/17 |
| 3,820,716 | 6/1974 | Bauer | 239/102 |
| 3,829,026 | 8/1974 | Aghnides | 239/394 |
| 3,864,031 | 2/1975 | Hossfield et al. | 251/138 |
| 3,907,204 | 9/1975 | Przystawik | 239/242 |
| 3,941,154 | 3/1976 | Bishop | 137/624.15 |
| 4,376,404 | 3/1983 | Haddad | 239/18 X |
| 4,453,700 | 6/1984 | Otsuki et al. | 251/129 |
| 4,614,300 | 10/1986 | Falcoff | 239/71 |
| 4,627,596 | 12/1986 | Busacchi | 251/129.07 |
| 4,647,008 | 3/1987 | Shirai et al. | 251/129.07 |
| 4,844,341 | 7/1989 | Alba | 239/18 |
| 4,892,250 | 1/1990 | Fuller et al. | 239/18 |

FOREIGN PATENT DOCUMENTS

| | | |
|---|---|---|
| 1272504 | 7/1968 | Fed. Rep. of Germany . |
| 2359717 | 11/1973 | Fed. Rep. of Germany . |
| 2837000 | 3/1980 | Fed. Rep. of Germany . |
| 429695 | 8/1974 | Spain . |
| 531050 | 3/1984 | Spain . |
| 1066662 | 1/1984 | U.S.S.R. . |
| 1212620 | 2/1986 | U.S.S.R. . |
| 11062 | 8/1884 | United Kingdom . |

*Primary Examiner*—Andres Kashnikow
*Assistant Examiner*—William Grant
*Attorney, Agent, or Firm*—Pennie & Edmonds

[57] ABSTRACT

An automatic system for the selective distribution of liquid streams comprising a plurality of nozzles, each with an inlet end and an outlet end and adapted to permit a flow therethrough of a liquid stream, for controlling the amount of liquid flow through each nozzle; and at least one decorative element coordinated with the flow of the liquid, wherein the flow through each valve is individually controllable by a microprocessor.

16 Claims, 6 Drawing Sheets

CIBERNETIC FOUNTAIN APPARATUS AND VALVE THEREFOR

CROSS-REFERENCE TO RELATED APPLICATION

The following application is a continuation-in-part of U.S. application Ser. No. 137,405 filed Dec. 22, 1987 and issued on July 4, 1989 as U.S. Pat. No. 4,844,341.

FIELD OF THE INVENTION

The invention relates to ornamental fountains, and more particular to cibernetically controlled fountains having independently controllable valve nozzles.

BACKGROUND OF THE INVENTION

In order to better understand the present invention, reference is made below to the technological milestones which have marked the development of ornamental fountains. Each successive stylistic step has been the consequence of the historical, technical and artistic context of its period. The fact that water jets and lighting elements depend on a suitable, constant source of energy has characterized the stylistic advance of ornamental fountains as very sensitive to the technical factors present during each period.

For this reason, until the development of electrical power sources at the end of the last century, ornamental fountains could simply be defined as fixed aquatic architecture, purely sculptural, and lacking their own lighting. Most of the time, water represented a mere accompaniment to the main motif of the fountain or sculptural group because the flow, which depended exclusively on pressures caused by natural differences in water levels, was scarce or intermittent. Consequently, the style of fountains during this period was linked to architecture or gardening, with a predominance of classical or baroque forms based on geometrical symmetries and repetitions.

The subsequent development of the electrical motor pump as a submersible water projector device provided autonomy to ornamental fountains. Water alone thus became capable of constituting the main motif of the fountain, observable both day and night. The possibilities of expression continued to be limited, however, by aquatic architecture which was fixed during this period, since technologically, it was not possible to vary the flows of the fountain. For this reason the creative efforts of those in the field was oriented toward the search for new water forms and different compositions. The style remained based on the classic geometry of symmetrical composition, since all the aquatic elements presented themselves simultaneously.

Thereafter, the related technology developed further and made it possible to incorporate systems utilizing the technique of sequential flow variation. As a result, the current state of the art, which could be called an electromechanical fountain, then appeared. Various devices were installed in these fountains, such as variable speed motors, motor-operated valves, mechanical programmers for sequential cutoff of the hydraulic circuits, etc.

A series of common characteristics governs these electromechanical ornamental fountains. For instance, it is possible to make various groups of aquatic elements appear or disappear. The fountain thus has various circuits that "play" with one another, forming various combinations which present themselves sequentially during a "period". The fountain can incorporate a program which, for example, follows the rhythm of a musical piece, as is the case in some recently developed fountains of which the inventor is aware.

Certain limitations must still be overcome, however For example, the valves for varying the liquid flow in these prior art fountains are located in a fountain machine room. For reasons of cost, they cannot be extended to each individual water jet, but rather they extend to cut off circuits that group a number of jets. These cut off circuits channel large flows of water and are not numerous. This arrangement leads to the following results, however, since the jets appear or disappear in groups, it is not possible to create a fountain without a symmetry in the composition, so that the style of the fountain retains its classic character.

On the other hand, the flows brought into play require large cutoff periods to avoid problems associated with the water hammer effect and vibrations, which may result in drawn out responses, caused by the inertias of these circuits. This characteristic, together with the limited number of available independent circuits, permits little flexibility in programming because the response times are generally not compatible with other elements of a noninertial nature, i.e., lighting, music, laser beams, etc., which ordinarily are incorporated in modern fountains.

In summary, therefore, today's state-of-the-art electromechanical fountain is installed as a group of independent circuits, each made up of different jets, for which reason they adopt a geometric composition of classical style. When plays of water are incorporated, the time necessary for a response to changes in water pressure is unnecessarily long, while the possibility of obtaining different water jet combinations is small, since the number of independent circuits that comes into play rarely exceeds ten.

As an illustration of the deficiencies found in present state-of-the-art fountains, FIGS. 1 *a–h* show various flow combinations attainable with prior art electromechanical fountains. In the embodiment disclosed in FIG. 1, it is assumed that the fountain contains four independent circuits which can appear and disappear individually in the course of the program or sequence of plays of the fountain. These circuits are represented separately in four views: FIG. 1*a* illustrates a central vertical jet. Surrounding this central jet is a "palm tree" formed of eight parabolic jets as shown in FIG. 1*b*. Further, outside this "palm tree" is a crown of twenty four vertical jets as shown in FIG. 1*c*. FIG. 1*d* illustrates a cupola formed by twenty-four parabolic jets that flow from the periphery to the interior of the fountain.

In total, therefore, the illustrated example utilizes fifty seven jets, grouped in four circuits. The jets corresponding to each circuit are activated simultaneously, for which reason each circuit is arranged in a symmetrical manner around the main axis of the fountain. Obviously, deviating from this symmetry would negatively affect the aesthetic appeal of the fountain.

Some of the possible combinations that may be obtained by grouping the circuits in FIGS. 1 *a–d* are shown in FIGS. 1 *e–h*. It will be seen immediately that the number of these combinations is very limited. Specifically, with four circuits it is not possible to establish more than fifteen different combinations, which is determinable by the number of combinations that can be made with four elements taken in groups of one, two, three or four elements respectively.

In summary, therefore, due to the inertia factor, which prevents obtaining a rapid rhythm in the sequence of the plays and in synchronization with noninertial elements, current fountain architecture is restricted to some neoclassic rules of symmetry and very few possible combinations.

SUMMARY OF THE INVENTION

The capabilities of the above-described prior art fountains may be enhanced by the expressive possibilities offered by light, used both in the traditional form of underwater colored spotlights or through new spectacular techniques offered with the use of laser beams. Since light is a simple action, noninertial element, the integral control of a multitude of points or directions may be accomplished with a microprocessor, thus permitting the abandonment of the classical composition. The creation of forms, patterns and designs more in keeping with present trends in art may thus be accomplished.

It is therefore an object of the present invention to provide a cibernetic ornamental fountain having independently controllable nozzles, incorporating a series of spectacular, decorative elements of any imaginable type, such as colored spotlights, musical elements, laser beam projectors, etc., coordinated among themselves so that the most varied sensory perceptions may be attained.

This and other objects may be attained by utilizing the possibilities offered by the present technology of cibernetic science and its related fields such as robotics, information science, telematics, etc.

One embodiment of the invention comprises a novel valve apparatus which may be individually controlled and placed at the outlet end of a water jet nozzle. In this manner, the relative response time to changes in water pressure is minimized and the number of possible combinations is greatly expanded. The valve comprises a generally cylindrical body member comprising an inlet cavity, an outlet cavity, and a valve bore therebetween for providing fluid communication between the cavities. This valve also includes means for selectively controlling liquid flow through the valve bore comprising a stopper member moveable along a central axis of the valve between a closed position, whereby the stopper substantially prevents the liquid from passing through the valve bore, and an open position, whereby a predetermined amount of liquid flows through the valve bore; means for biasing the stopper member toward the closed position; and means for moving the stopper member to the open position to allow the predetermined amount of liquid to flow through the valve bore. The moving means includes an electromagnetic controller capable of providing forces for displacing the stopper to any one of a number of positions, each of which allow a different amount of liquid flow through the valve bore. Thus, when the valve bore is open, the predetermined amount of liquid flows through the valve bore and exits through the outlet cavity.

A second embodiment of the invention comprises a cibernetic fountain employing the valve of the present invention, which could be constructed with any number of individualized jets controlled at a rapid rate by a computer or programmable robot. Such a fountain is capable of creating multiple figures, variations, pursuits, etc., or interpreting a musical piece with a real aquatic ballet. In the case of a fountain constructed according to the present invention being of similar size to that of the prior art example, the number of possible combinations for the fifty seven elements described with regard to the prior art electromechanical fountain exceeds a hundred trillion. For these figures it is not possible to speak of a quantitative, but only of a qualitative leap. That is to say that it is not possible to represent in figures all the unlimited possibilities that are opened up by the present apparatus since it provides a system with innumerable degrees of freedom.

By analogy, a cibernetic fountain as described herein may be compared to a graphic screen of a computer in which each element or pixel has an individualized, simultaneous control of its intensity and color parameters, with noninertial variation. The expressive possibilities of these screens do not depend either on the screen itself or the power of the computer when they are connected, as is the case of animated cartoons.

Analogously, a cibernetic fountain can be structured by having a sufficiently ample network of nozzles and colored spotlights. A further embodiment of the present invention is a method for selectively distributing a plurality of liquid streams in a manner so as to create the multiple figures, variations and pursuits as described above and/or with the intention of interpreting a musical score by creating an aquatic ballet corresponding thereto. The selective operation of various groups of elements according to a pre-selected program can give rise to an infinite number of figures and fantasies. Fish, boats, flowers, trees, abstract bodies, ballerinas, etc., can appear, move and dance with no limitations other than the imagination of the designer and programmer of the fountain.

BRIEF DESCRIPTION OF THE DRAWINGS

FIG. 1 generally illustrates a typical prior art fountain having four separate water circuits. Each circuit is individually portrayed in FIGS. 1 *a–d.* FIGS. 1 *e–h* show some of the different combinations obtainable;

FIGS. 2*a* and 2*b* are two views which indicate motion of a sail-like figure in the direction of the arrows;

FIGS. 2*c* and 2*d* show a sine wave formation created with the cibernetic fountain of the present invention, with the motion of the figure in the direction of the arrows;

DETAILED DESCRIPTION OF THE INVENTION

Figure 1A:
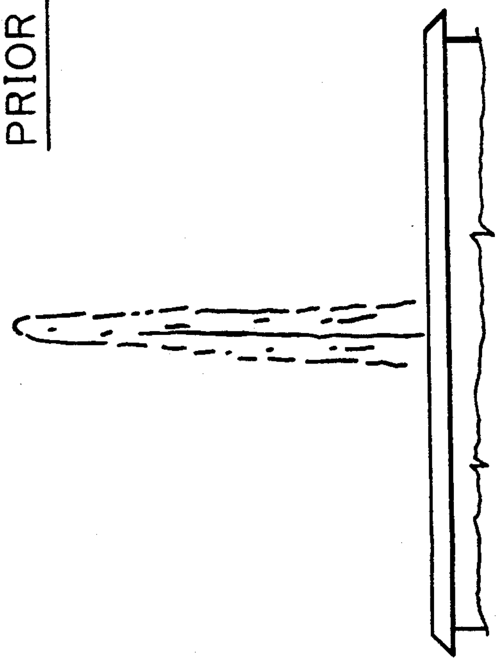
FIG. 1A PRIOR ART
FIG. 1*a* is a central vertical jet.
Figure 1B:
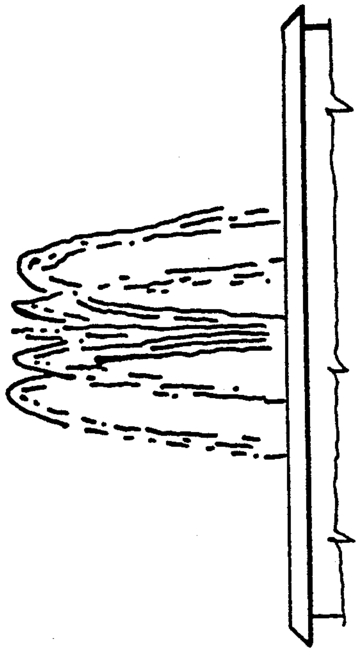
FIG. 1*b* is a palm tree-like configuration of eight parabolic jets.
Figure 1C:
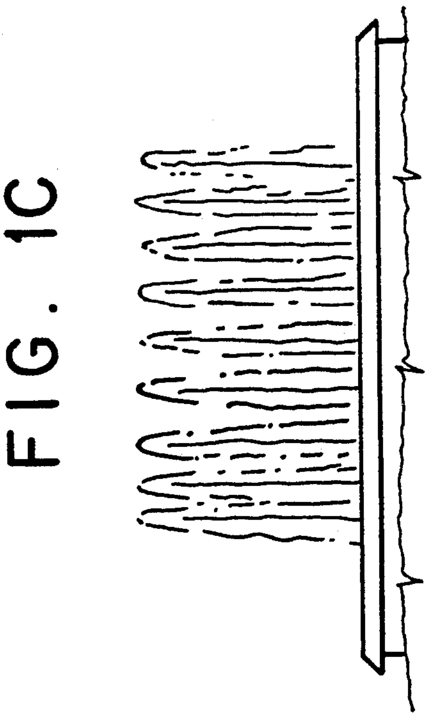
FIG. 1*c* is a crown of twenty four vertical jets.
Figure 1D:
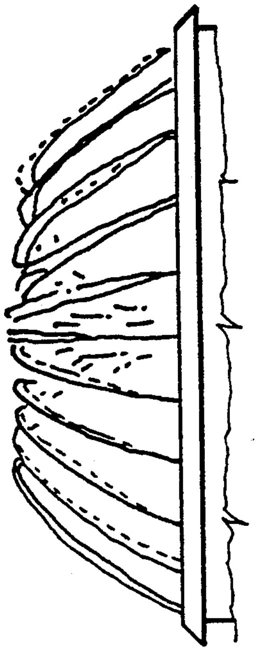
FIG. 1*d* is a cupola formed by twenty four parabolic jets.
Figure 1E:
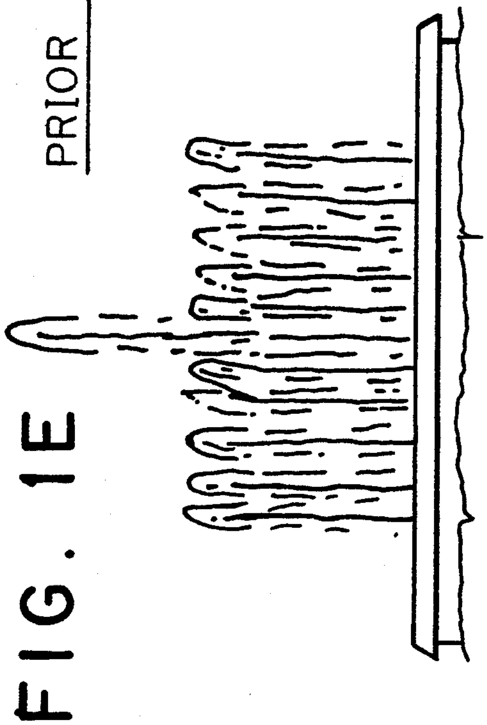
FIG. 1E PRIOR ART
FIG. 1*e* shows a combination of jets as shown in FIGS. 1*a* and 1*c;*
Figure 1F:
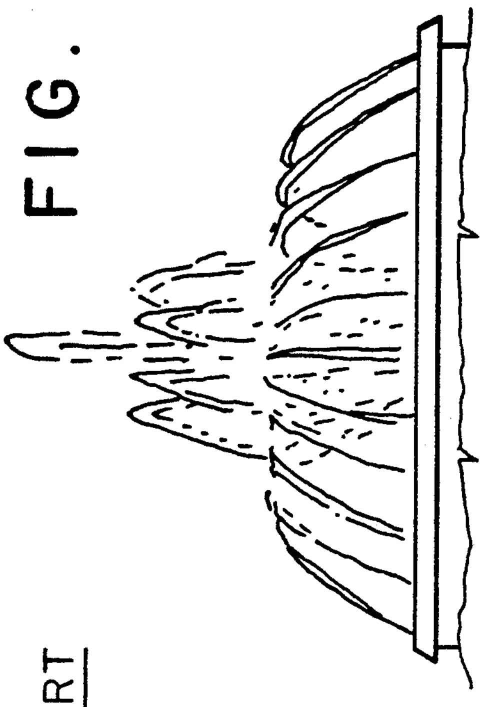
FIG. 1*f* shows a combination of jets as shown in FIGS. 1*a,* 1*b* and 1*d;*
Figure 1G:
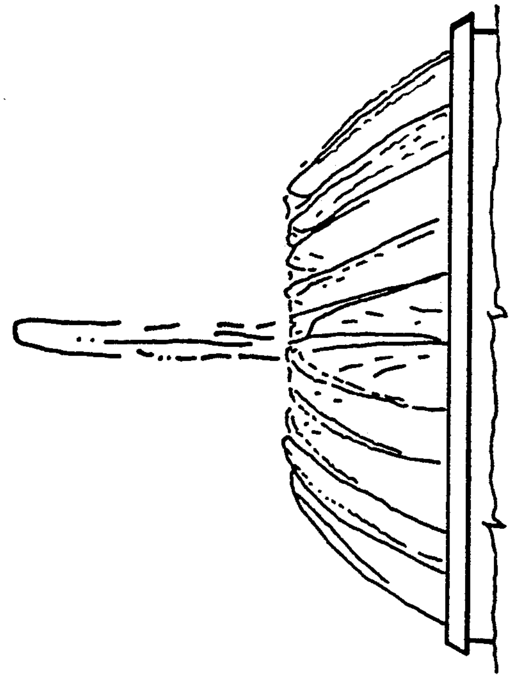
FIG. 1*g* shows a combination of jets as shown in FIGS. 1*a* and 1*d;*
Figure 1H:
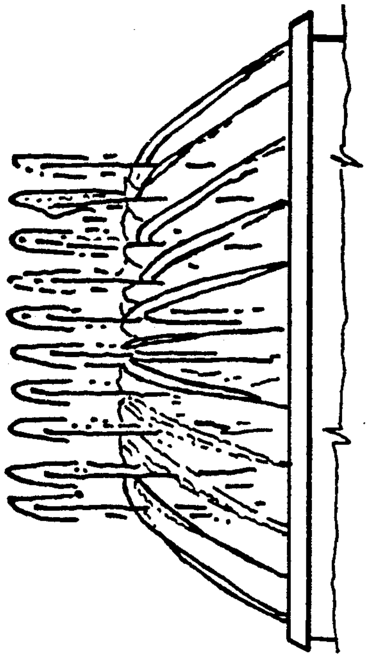
FIG. 1*h* shows a combination of jets as shown in FIGS. 1*c* and 1*d;*
Figure 2A:
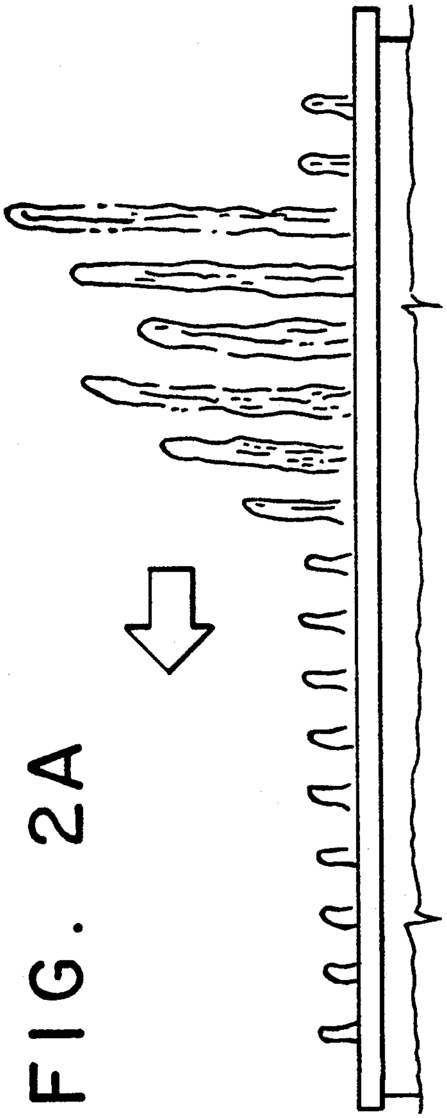
FIGS. 2*a*–2*d* show representative displays which could be created with the cibernetic fountain of the present invention.
Figure 2B:
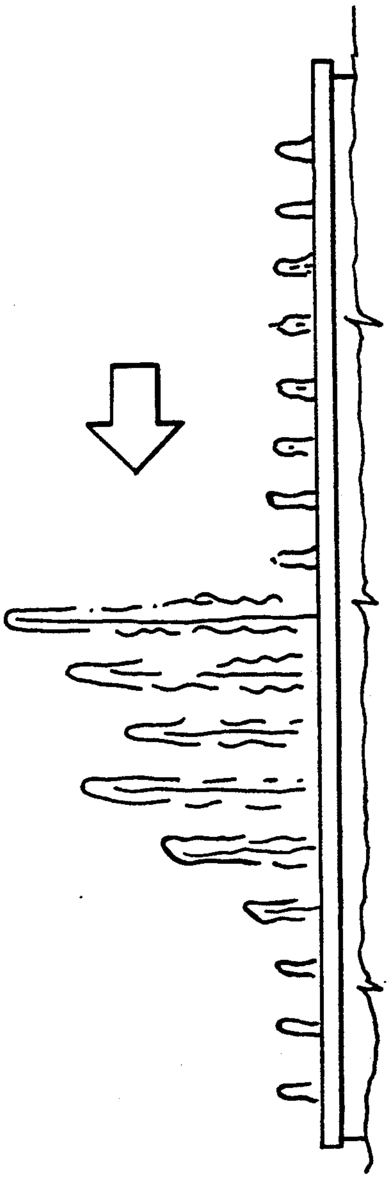
Figure 2C:
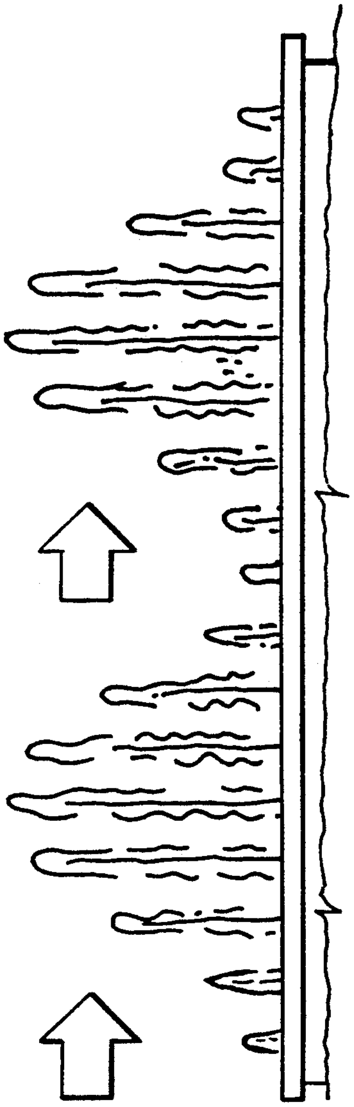
Figure 2D:
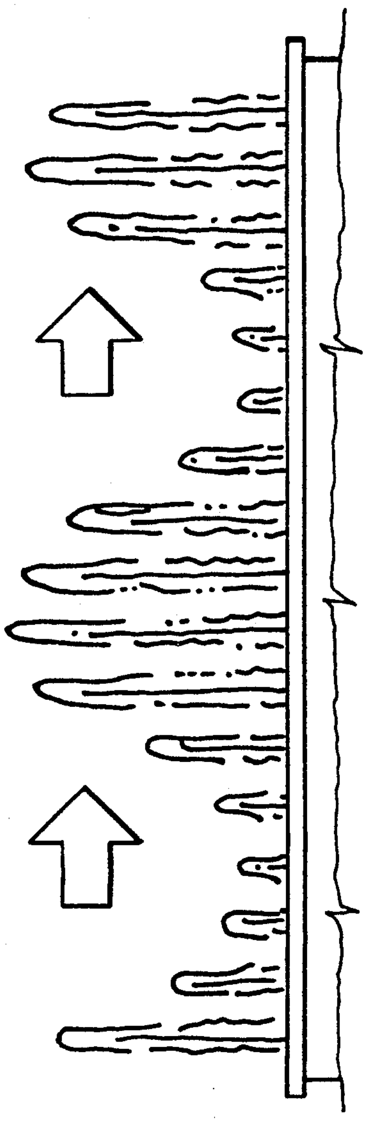

By way of nonlimiting example, FIGS. 2*a* through 2*d* illustrate the expressive characteristics of the present cibernetic fountain. In these figures a small group of vertical jets are represented which, when controlled by the valve apparatus disclosed herein, can create mobile figures which are transmitted along the fountain in the same way as the undulating movement of a wave, i.e., without there being a physical transmission of material. FIGS. 2*a* and 2*b* represent sails that advance whereas FIGS. 2*c* and 2*d* illustrate waves that travel through the fountain. This is in contrast to the traditional fountain (FIG. 1) where the only possible movement is one-dimensional, i.e., in height, that is to say that the jet only goes up or down.

In the present cibernetic fountain, another dimension is added i.e., that of horizontal movement, either in a direction crosswise to the observer or in depth. With this new spatial dimension, additional opportunities are gained in figurative expression, i.e., in addition to the capacity to synchronize each point of water with a spotlight. In this manner, color has finally been associated with water with equal expressive richness. In fact, the freedom of expression offered by the subject fountain is now total since a composition does not have to be subjected to a classic symmetry, due to the fact that each jet is independent of the rest.

The water now becomes a protagonist and can carry on a dialogue with the light to the rhythm of an accompanying musical selection. Even without music, however, the most varied designs and movements can be created. The present fountain may now be considered as a medium of expression having sufficient class individually to rise to the level of present-day art. The cibernetic fountain is designed to obtain an individualization of its elemental jets, with the possibility of direct operation by a microprocessor, and with a suitable respect for noninertial elements. This makes possible not only a total integration of water, light and music but also a flexibility and total freedom in fountain design, capable of meeting by forms and original movements the creative requirements of modern art.

The present fountain is provided with a plurality of nozzles, each controlled by a corresponding valve. These valves may be individually, simultaneously controlled by a microprocessor unit utilizing a specialized program, so that each nozzle can selectively vary the liquid flow and therefore the height of the jet associated with it. The present fountain may also incorporate complementary ornamental elements such as colored lights, music, laser beams, etc., which may be integrated in a synchronized manner with the water in the program controlled by the microprocessor.

Figure 3:
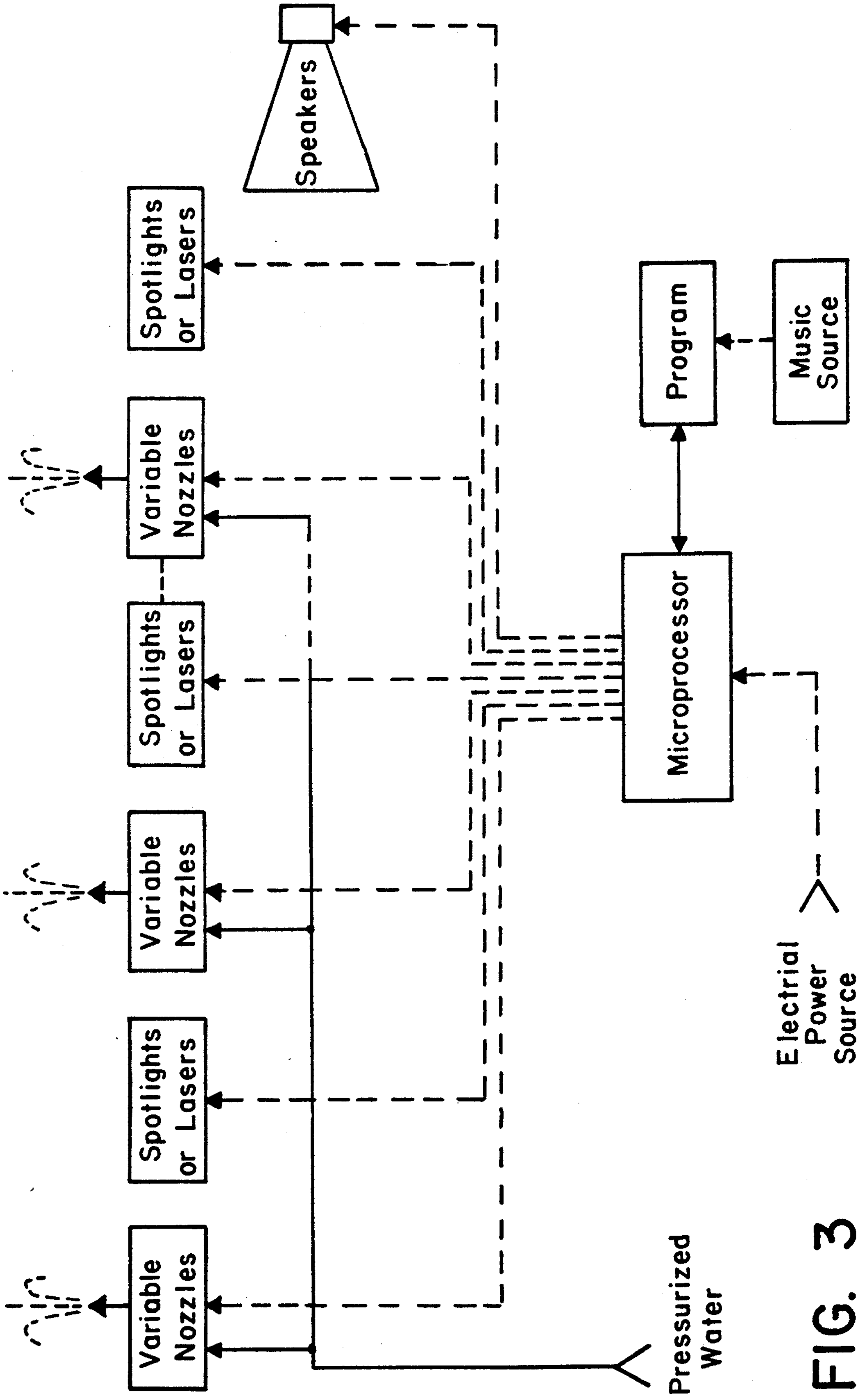
FIG. 3 is a schematic diagram of the cybernetic fountain of the present invention.

A preferred embodiment of the invention is schematically illustrated in FIG. 3, which diagrams the characteristic elements of the present cibernetic fountain: the cutoff elements, i.e., variable nozzles, which are specifically set for each individual jet, the light and musical elements, the control microprocessor with its specific program, and the hydraulic and electrical means of connecting all the elements together. The solid lines represent hydraulic connections while the dashed lines stand for electrical connections between various elements of applicant's cibernetic fountain.

In the present description, it is, of course, assumed that the necessary supplies of pressurized water and electrical power are available. The variable nozzles are connected to the water network with a suitable connecting means and the microprocessor is electrically connected, as are the light and musical elements. Musical reproduction equipment supplies suitable input sounds or excitation for the microprocessor which, upon following the instruction of the specific program, produces the output signals for the synchronized control of the visible elements of the fountain.

Figure 4:
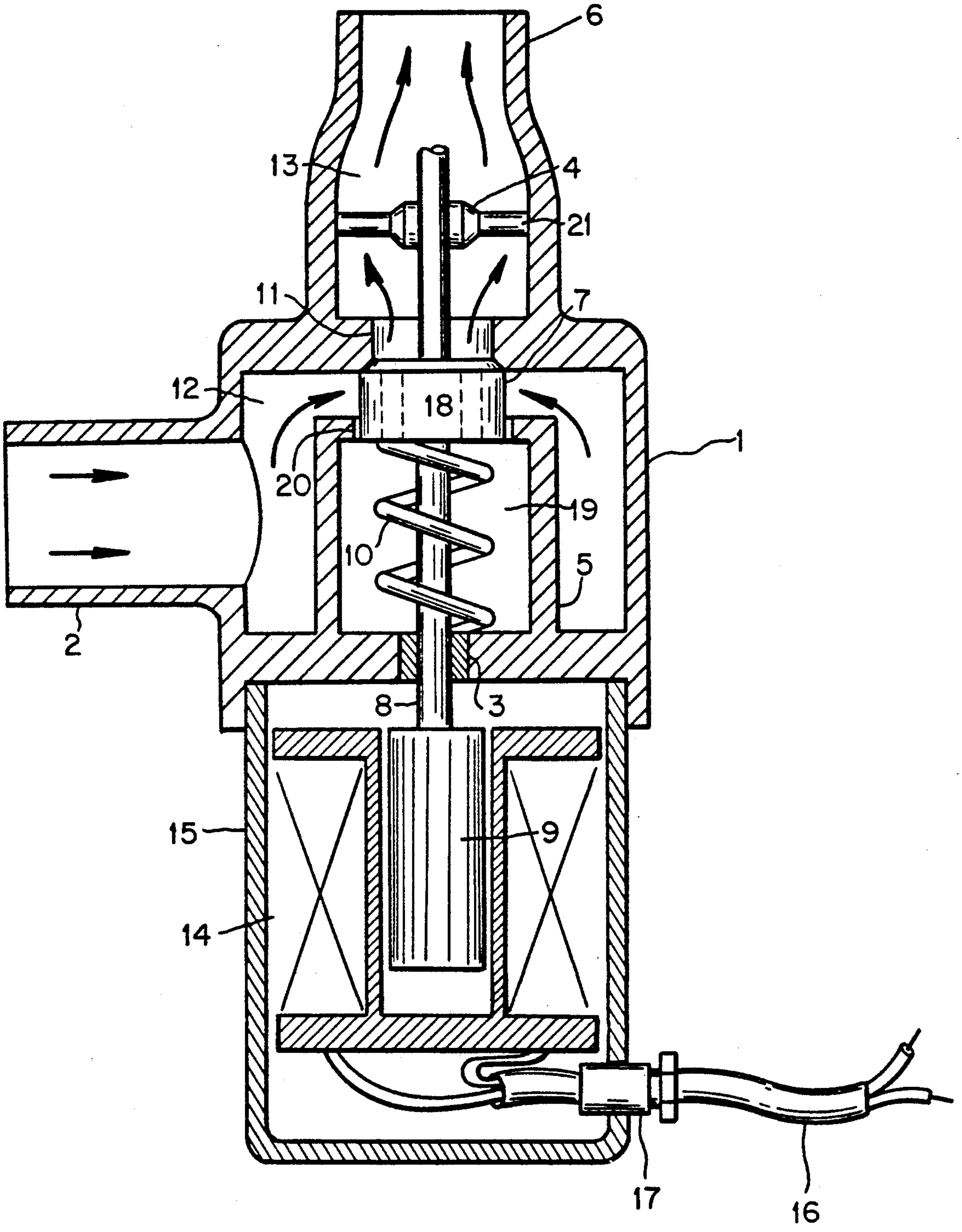
FIG. 4 shows a longitudinal section along the principal axis of the valve of the present invention.

In the embodiment described above, nozzles are available in sufficient number to provide the desired effects. Each of the variable nozzles is characterized by a means for ejection of water which comprise small openings therein, means for flow regulation, i.e., variable cutoff and means for electrical control and connection of the microprocessor. By way of nonlimiting illustration, a valve according to the invention for a variable nozzle is represented in FIG. 4.

This valve having cylindrical symmetry comprises a cylindrical body (1) with a side opening (2) that is connected to the discharge pipe of the cybernetic fountain through which water enters. Inside the body are two bearings (3), (4) and a jacket (5), all of which are detachable to permit maintenance and placement of the remainder of the devices. The body ends at the top in a water outlet (6), to which is connected an ejector nozzle which produces the jets of the fountain controlled by this valve.

The flow of water from the inlet (2) to the outlet (6) is marked by the arrows. The bearing (4) is fixed to the body (1) by means of rods (21) having relatively small cross-sectional diameters so as to permit the free passage of water through this zone.

A plugging mechanism, separate from the body, includes a sliding unit having a stopper (7) mounted upon a shaft (8) the opposite end of which has a ferromagnetic core (9). In the closed position, as shown in FIG. 4, the flow of water is cut off by seating the stopper (7) against valve bore (11), thereby blocking the connection between the inlet cavity (12) and the outlet cavity (13). In this position, stopper (7) is wedged against bore (11) by forces exerted from spring (10). The shaft (8) of this plugging mechanism slides on bearings (3) and (4).

The control device comprises an electromagnetic coil (14) hermetically sealed in container (15) fastened to body (1). Electric cables (16) exit the container (15) through an appropriate stuffing box (17) and are connected to the equipment which operates the fountain by a microprocessor. As long as there is no electric voltage in the coil, the spring (10) biases stopper (7) against bore (11), thereby causing the valve to remain closed. When the coil is excited, core (9) is attracted with a force greater than that of the spring (10), with the core (9), shaft (8) and stopper (7) therefore being attracted to each other, so that the stopper (7) moves away from bore (11) to open the valve and allow the flow to pass from the inlet cavity (12) through the bore (11) to the outlet cavity.

One fundamental characteristic of this valve includes the provision of axial holes (18) in the stopper (7), so that, in any position of the valve, inlet cavity (13) is hydraulically connected with cavity (19), which surrounds the spring (10) within jacket (5). In this way, the pressures on both faces of the stopper are essentially the same, so that the valve can operate independent of the liquid pressure in the fountain. Otherwise, static stresses would occur, representing a variable resistance of considerable magnitude which would interfere with the direct control mechanism of the valve. Cavity (19) must, of course, be isolated from (12), otherwise considerable water would pass through the holes (18), thus bypassing the stopper (7). A seal is made on the small surface (20) between jacket (5) and stopper (7). Another important characteristic of the valve is that the seal (20) is not completely hermetic in order to avoid jamming and friction of movement of the stopper (7) in the valve by particles carried along in the water from a fountain, inevitably not devoid of dirt. This incomplete seal is indispensible for proper operation of the valve, and is also compatible with the aesthetics of the fountain, since the relatively small volume of flow that escapes through the seal does not produce any appreciable head in the jet, with the valve appearing "closed" to the observer.

Finally, the only reactions to the movement of the valve are the static ones produced on the bearings and the dynamic ones of the water on the stopper. These are perfectly compatible with direct control, which provides minimum response times, in conformity with the aesthetic effects desired for a cybernetic fountain.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

I claim:

1. An automatic system for the selective distribution of liquid streams comprising:

a plurality of liquid delivery members, each having a liquid inlet and a liquid outlet and adapted to permit a liquid stream to flow therethrough;

a valve associated with each liquid delivery member for varying the flow of said liquid stream therethrough comprising:

a generally cylindrical body member comprising an inlet cavity, an outlet cavity, and a valve bore therebetween for providing fluid communication between said cavities;

means for selectively controlling liquid flow through said valve bore comprising:

a stopper member moveable along a central axis of said valve between a closed position, whereby said stopper substantially prevents said liquid from passing through said valve bore, and an open position, whereby a predetermined amount of liquid flows through said valve bore;

means for biasing said stopper member toward said closed position; and means for moving said stopper to said open position to allow said predetermined amount of liquid to flow through said valve bore, said moving means including an electromagnetic controller capable of providing forces for displacing said stopper to any one of a number of positions each of which allow a different amount of liquid flow through said valve bore;

wherein when said valve bore is open, said predetermined amount of liquid flows through said valve bore and exits through said outlet cavity;

wherein the flow of said liquid through the liquid outlet of each of said delivery members is individually controllable by microprocessor means operating each of said valves.

2. The system of claim 1 wherein said stopper member of each valve includes one or more axial holes to equalize the liquid pressure on both of sides of said stopper member, so as to allow opening and closing of each valve independently of the liquid pressure in the respective delivery member.

3. The system of claim 1 wherein said outlet end of said liquid delivery member further comprises a spray head for creating a predetermined flow pattern or effect.

4. The system of claim 1 wherein an effect produced by at least one decorative means, operatively associated with said microprocessor means, is coordinated with said flow of said liquid.

5. The system of claim 4 wherein said at least one decorative means is a spotlight, a music source or a laser beam projector.

6. The system of claim 1 wherein the biasing means for each valve comprises a spring and wherein said stopper member is mounted upon a shaft, one end of which extends through said valve bore, the other end of which includes a ferromagnetic core which is operatively associated with said electromagnetic controller.

7. The system of claim 6 wherein the electromagnetic controller for each valve includes an electromagnetic coil for moving said ferromagnetic core to a predetermined position when energized.

8. The system of claim 7 wherein said microprocessor allows an electric potential to be applied to said electromagnetic coil to generate a force in magnitude greater than that of precompression of the spring to displace said stopper member thereby opening said valve bore.

9. A cibernetic fountain apparatus which comprises:

a plurality of liquid delivery members, each having a liquid inlet and a liquid outlet and adapted to permit a liquid stream to flow therethrough;

a valve, positioned within each of said delivery members, each valve comprising:

a generally cylindrical body member comprising an inlet cavity, an outlet cavity, and a valve bore therebetween for providing fluid communication between said cavities;

means for selectively controlling liquid flow through said valve bore comprising:

a stopper member moveable along a central axis of said valve between a closed position, whereby said stopper substantially prevents said liquid from passing through said valve bore, and an open position, whereby a predetermined amount of liquid flows through said valve bore;

means for biasing said stopper member toward said closed position; and means for moving said stopper to said open position to allow said predetermined amount of liquid to flow through said valve bore, said moving means including an electromagnetic controller capable of providing forces for displacing said stopper to any one of a number of positions each of which allow a different amount of liquid flow through said valve bore;

wherein when said valve bore is open, said predetermined amount of liquid flows through said valve bore and exits through said outlet cavity;

wherein the flow of said liquid through the liquid outlet of each of said delivery members is individually controllable by microprocessor means operating each of said valves;

said outlet end of said liquid delivery member further comprising a spray head adapted to create a predetermined liquid spray flow pattern; and at least one decorative element selected from spotlights, a musical source and laser beam projectors, an effect produced by said element being coordinated with said liquid flow.

10. A valve for selectively controlling a stream of a liquid, said valve comprising:

a generally cylindrical body member comprising an inlet cavity, an outlet cavity, and a valve bore therebetween for providing fluid communication between said cavities;

means for selectively controlling liquid flow through said valve bore comprising:

a stopper member movable along a central axis of said valve between a closed position, whereby said stopper substantially prevents said liquid from passing through said valve bore, and an open position whereby a predetermined amount of liquid flows through said valve bore, said stopper mounted upon a shaft, one end of which extends through said valve bore and the other end of which includes a ferromagnetic core controlled by an electromagnetic controller, said shaft mounted in at least two bearing members for allowing axial movement of said shaft and stopper member between said closed and open positions;

means for biasing said stopper valve toward said closed position; and means for moving said stopper to said open position to allow said predetermined amount of liquid to flow through said valve bore, said moving means including an electromagnetic controller capable of providing forces for displacing said stopper to any one of a number of positions each of which allow a different amount of liquid flow through said valve bore;

wherein when said valve bore is open, said predetermined amount of liquid flows through said valve bore and exits through said outlet cavity;

wherein the flow of said liquid through the outlet cavity of each said valve is individually controllable by separate microprocessor means operatively associated therewith.

11. The valve of claim 10 wherein said stopper member includes means to equalize the liquid pressure on each side of said stopper member so as to allow opening and closing of the valve bore independently of the liquid pressure in the valve.

12. The valve of claim 10 wherein said biasing means includes a spring.

13. The valve of claim 12 wherein said spring is protected from exposure to said liquid flow by a jacket, one end of which includes said stopper member and a partial seal between said stopper member and said jacket.

14. The valve of claim 13 wherein the stopper member includes at least one axial hole therein to equalize the fluid pressure within said jacket to that on the opposite side of said stopper member.

15. A valve for selectively controlling a stream of a liquid, said valve comprising:

a generally cylindrical body member comprising an inlet cavity, an outlet cavity and a valve bore therebetween for providing fluid communication between said cavities;

a stopper member moveable along a central axis of said valve between a closed position, whereby said stopper substantially prevents said liquid from passing through said valve bore, and an open position whereby a predetermined amount of liquid flows through said valve bore, said stopper member including at least one axial hole therein to equalize the liquid pressure on each side of said stopper member so as to allow opening and closing of the valve bore independently of the liquid pressure within the valve;

means comprising a spring for biasing said stopper member toward said closed position wherein said spring is protected from exposure to said liquid flow by a jacket, one end of which includes said stopper member and a partial seal between said stopper member and said jacket and wherein said seal has an opening sufficient to prevent particulate debris from interfering with the movement of said stopper member between open and closed positions; and means for moving said stopper to said open position to allow said predetermined amount of liquid to flow through said valve bore, said moving means including an electromagnetic controller capable of providing forces for displacing said stopper to any one of a number of positions each of which allow a different amount of liquid flow through said valve bore;

wherein when said valve is open, said predetermined amount of liquid flows through said valve bore and exits through said outlet cavity; and wherein the flow of liquid through the outlet cavity of each said valve is individually controllable by separate microprocessor means operatively associated therewith.

16. A valve for selectively controlling a stream of a liquid, said valve comprising:

a generally cylindrical body member comprising an inlet cavity, an outlet cavity and a valve bore therebetween for providing fluid communication between said cavities;

a stopper member mounted upon a shaft and movable along a central axis of said valve between a closed position whereby said stopper substantially prevents said liquid from passing through said valve bore, and an open position wherein a predetermined amount of liquid flows through said valve bore, one end of said shaft extending through said valve bore and the other end including a ferromagnetic core controlled by an electromagnetic controller, wherein said shaft is mounted in at least two bearing members for allowing axial movement of said shaft and stopper member between said closed and open positions, and wherein said stopper member includes at least one axial hole therein to equalize the liquid pressure on each side of said stopper member so as to allow opening and closing of the valve bore independently of the liquid pressure within the valve;

means for biasing said stopper member toward said closed position; and means for moving said stopper to an open position to allow said predetermined amount of liquid to flow through said valve bore, said moving means including said electromagnetic controller capable of providing forces for displacing said stopper to any one of a number of positions each of which allow a different amount of liquid flow through said valve bore;

wherein when said valve is open, said predetermined amount of liquid flows through said valve bore and exits through said outlet cavity; and wherein the flow of liquid through the outlet cavity of each said valve is individually controllable by separate microprocessor means operatively associated therewith.

* * * * *